US011952708B1

(12) United States Patent
Henry

(10) Patent No.: US 11,952,708 B1
(45) Date of Patent: Apr. 9, 2024

(54) METHOD AND APPARATUS FOR DRYING GLOVES AND OTHER OBJECTS

(71) Applicant: Equine Performance Consulting, LLC, Lafayette, LA (US)

(72) Inventor: Barry J. Henry, Lafayette, LA (US)

( * ) Notice: Subject to any disclaimer, the term of this patent is extended or adjusted under 35 U.S.C. 154(b) by 0 days.

(21) Appl. No.: 17/895,533

(22) Filed: Aug. 25, 2022

Related U.S. Application Data

(60) Provisional application No. 63/237,734, filed on Aug. 27, 2021.

(51) Int. Cl.
*D06F 59/04* (2006.01)
*F26B 21/00* (2006.01)

(52) U.S. Cl.
CPC ............ *D06F 59/04* (2013.01); *F26B 21/008* (2013.01)

(58) Field of Classification Search
CPC .......... D06F 59/00; D06F 59/02; D06F 59/04; A47L 23/20; A47L 23/205; F26B 21/008
See application file for complete search history.

(56) References Cited

U.S. PATENT DOCUMENTS

| | | | | |
|---|---|---|---|---|
| 5,983,518 | A * | 11/1999 | Ellenburg | D06F 59/04 34/106 |
| 7,716,849 | B1 | 5/2010 | Hicks | |
| 8,079,156 | B1 | 12/2011 | Parish | |
| 8,235,656 | B2 | 8/2012 | Wilson et al. | |
| 8,365,431 | B1 | 2/2013 | Parish | |
| 9,802,523 | B1 * | 10/2017 | Galbraith | B60N 3/103 |
| 2002/0138953 | A1 | 10/2002 | Passafiume | |
| 2009/0100699 | A1 | 4/2009 | Hasler | |
| 2019/0301080 | A1 | 10/2019 | Evans, Sr. | |
| 2021/0222353 | A1 * | 7/2021 | Durham | D06F 59/04 |

FOREIGN PATENT DOCUMENTS

KR 101868581 B1 6/2018

* cited by examiner

*Primary Examiner* — F Griffin Hall
(74) *Attorney, Agent, or Firm* — Ted M. Anthony

(57) ABSTRACT

A portable glove drying apparatus having a housing defining an inner chamber containing a fan and power source, as well as a sized outlet for receiving a golf glove. A flexible but resilient loop is disposed across the sized outlet and can be inserted in a golf glove to support and expand the golf glove from its inside. The fan can generate air flow that is directed into a base opening of the glove and out of ventilation holes of the golf glove. The air flow acts to improve evaporation of moisture contained on or in the golf glove and thereby promotes rapid drying of the golf glove.

13 Claims, 9 Drawing Sheets

METHOD AND APPARATUS FOR DRYING GLOVES AND OTHER OBJECTS

CROSS REFERENCES TO RELATED APPLICATIONS

This application claims priority of U.S. provisional patent application Ser. No. 63/237,734, filed Aug. 27, 2021, incorporated herein by reference.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to a device for drying gloves and other objects. More particularly, the present invention pertains to device that can be easily and efficiently mounted within a golf cart or other desirable location, and that can be used to dry damp golf gloves, hats, towels and other objects. More particularly still, the present invention pertains to a drying apparatus having a quiet, variable-speed fan that can be used to dry damp gloves, hats and other objects used while playing or practicing the game of golf.

2. Brief Description of the Related Art

The game of golf is played outdoors, typically in the elements. The game is played by humans through the interaction of a golf club with a golf ball; a golf club is typically gripped by a player and swung to strike a golf ball. The swung golf club imparts an impactful force on a golf ball which causes the golf ball to move, hopefully in a direction toward a desired target.

Golf is typically played on a green-scape of land designated as a golf course. Golf courses are found throughout the world and are situated within many different environments and weather climates. As such, many different environmental conditions can come into play that can negatively impact a player's ability to properly grip a golf club. More specifically, such conditions can often impair interaction of a player's hands with a golf club.

Equipment in the sport of golf is generally centered around a golf club and a golf ball. A golf club generally comprises a club head (typically having a defined hitting area) disposed at a distal end of a club shaft. Although sizes and characteristics can vary, said club shafts typically comprise a substantially stiff, yet somewhat flexible, rod having a defined length. The proximal end of the golf club shaft is typically covered with a golf club "hand grip." As the name suggests, the hand grip is generally held in a player's hands, and frequently comprises leather, rubber, or other composite material(s) that can improve a player's ability to hold on to the golf club and control the club head during a swing and impact with a golf ball.

Control of a golf club (and, in particular, a club head) can be critically important for striking a ball consistently. As a general principle, such consistency improves a golfer's performance and scoring outcome. Control of a golf club also prevents injury to golfers and others, as well as damage to a golf club, because the speed of a clubhead can approach over 135 miles per hour when swung by skilled players. When a golf grip is slippery or wet, a golfer can lose control of a golf club, causing said club to fly into the air and injure other persons or damage property (including, without limitation, the golf club itself). A reliable and consistent grip between a golfer's hands and the golf club hand grip is often improved by drying the golf club hand grip, the golfer's hand, or both, such as with a dry towel.

Golfers commonly wear golf gloves in order to ensure a reliable and consistent grip between the golfer's hands and a golf club hand grip. Such golf gloves are typically made from leather or other synthetic material and are designed to improve the frictional hold between a golfer's hands and a golf club grip. Unfortunately, such golf gloves often become damp and saturated, particularly in hot and humid conditions (for example, in tropical climates) and during rainstorms or other precipitation. Even when there is no rain or other precipitation, heat and humidity can cause a golfer's forearms and hands to sweat profusely, especially in hot climates and other tropical environments. When this occurs, golf gloves can become damp and slippery, thereby greatly reducing or eliminating the benefit provided by said gloves.

Currently, the only solution to a damp and slippery golf glove is to have at least one other "dry" glove available for replacement of the original golf glove. Even when a wet golf glove is replaced with a dry replacement glove, such replacement glove frequently provides little relief because the replacement glove also becomes damp and slippery from the same conditions that affected the original glove (such as, for example, sweat, rain or other precipitation). As such, any relief afforded by multiple gloves is usually only temporary, and the use of numerous extra golf gloves can be expensive, inconvenient and wasteful.

Further, a wet or damp golf glove placed into a golf bag or on a golf cart seat has minimal time to dry in the air and often breeds fungi and bacteria which can expose a golfer to infectious processes of the hands and/or webspace. Such processes can include, without limitation, paronychial infection and/or other conditions that can limit playing time, negatively impact performance and cause significant discomfort to a golfer.

To date, there has been no effective and cost-efficient solution to the problem of damp and slippery golf gloves. Thus, there is a need for a means for keeping golf gloves (as well as hats, towels, and other ancillary equipment) dry while playing or practicing the game of golf.

SUMMARY OF THE INVENTION

The present invention comprises a portable rechargeable dryer apparatus that can be used to dry a golf glove, as frequently as after every shot. The dryer apparatus of the present invention can be temporarily mounted within a cup holder of a conventional golf cart or removably attached to a conventional golf bag. The dryer apparatus of the present invention is light-weight and convenient to use, while adding minimal additional weight to a carried golf bag. Further, said dryer apparatus operates quietly, so it makes little noise to disturb players, particularly during a competitive game or during period(s) of concentration.

In a preferred embodiment, the present invention comprises modular outer housing defining an inner space as well as a substantially cylindrical throat member defining a central outlet. A high static pressure fan with an attached rechargeable battery pack is disposed within said inner space of said housing. Said components can be manufactured in any number of different manners, including using three-dimensional (3-D) printing technology.

Said housing also generally contains electrical wires or other connections, as well as a switch that is included within circuitry for controlling the speed of said fan. Said high static pressure fan is supported inside the inner space of said housing and directs air flow through a primary outlet port in said throat member, as well transverse ports or vents extending through said throat member.

Said fan can be powered, and/or said battery can be recharged, using electricity generated from solar energy or other power source. Said battery can be recharged using a cable (such as, for example, a micro-usb cable) that can be attached to a charging port (such as, for example, on a powered golf cart or battery pack charger).

The base of said housing is beneficially configured to be received within a cup holder, such as a cup holder of a conventional golf cart, while maintaining stability of said housing. Alternatively, said housing can attach (via a ball and socket joint or other mounting mechanism), to a surface on any golf bag, or powered or walking golf bag cart. Said housing allows inward airflow through slots and fenestration on the bottom and/or sides of said housing.

Said throat member allows the palm of a golf glove to fit over its rounded substantially cylindrical shape. A flexible yet resilient loop member can be received within said glove to keep said glove supported and expanded to receive air movement through ventilation holes into each finger and the palm of said glove, thus improving drying efficiency and reducing drying time.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
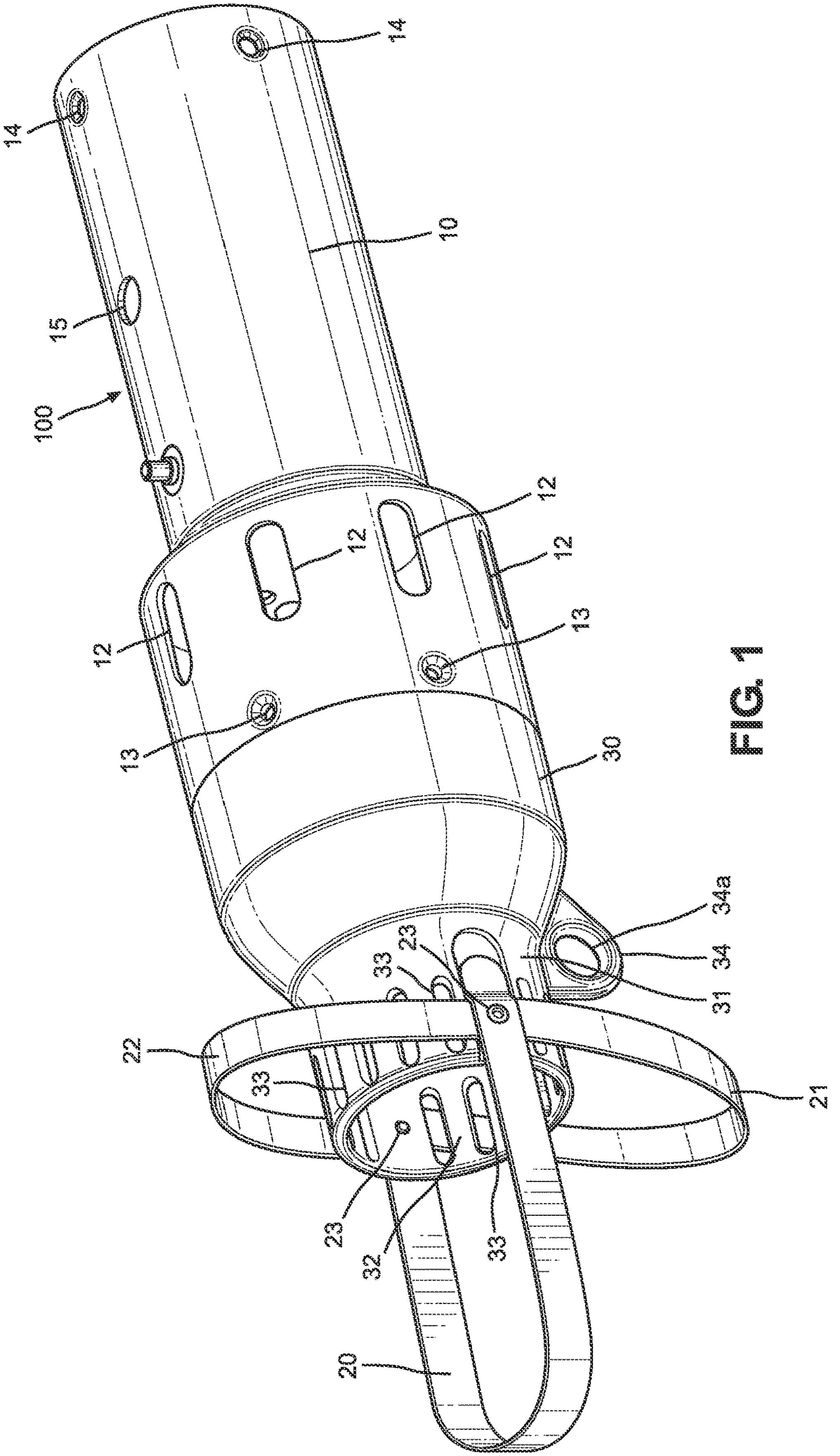
FIG. 1 depicts a side perspective view of a dryer apparatus of the present invention.
Figure 2:
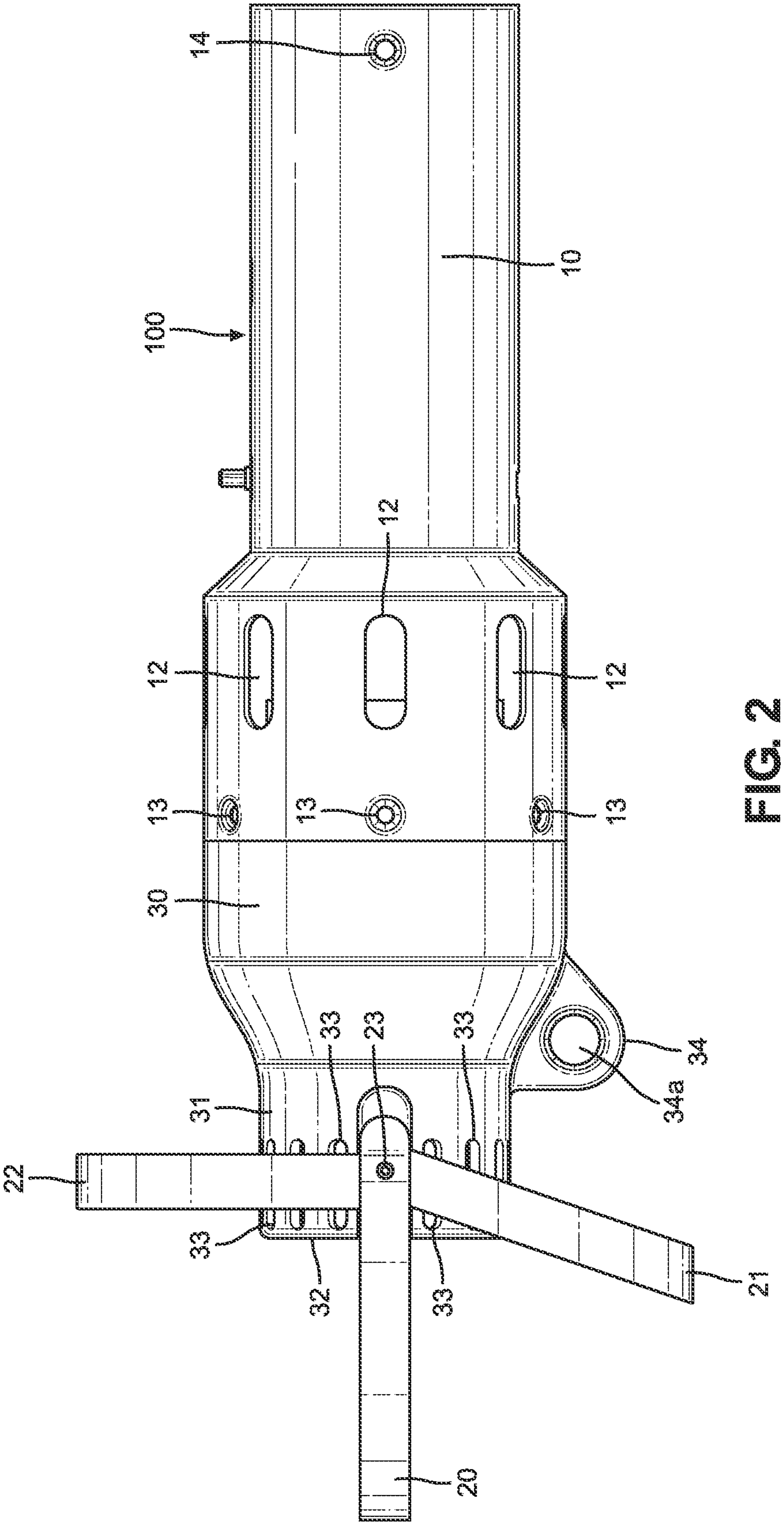
FIG. 2 depicts a side view of a dryer apparatus of the present invention.

Referring to the drawings, FIG. 1 depicts a side perspective view of a dryer apparatus 100 of the present invention, while FIG. 2 depicts a side view of said dryer apparatus 100. Dryer apparatus 100 generally comprises a portable and rechargeable dryer apparatus that can be used to quickly and efficiently dry golf gloves. Dryer apparatus 100 is lightweight and convenient to use, while adding minimal incremental additional weight to a carried golf bag. Further, said dryer apparatus 100 operates quietly with very little noise to disturb players and/or others in the vicinity of said dryer apparatus, particularly during competitive game situations and/or during period(s) of concentration (including, without limitation, during practice).

In a preferred embodiment, dryer apparatus 100 of the present invention comprises modular outer housing comprising lower housing member 10 and upper housing member 30. Said lower housing member 10 and upper housing member 30 can be joined together via conventional means (such as, for example, conventional screws or other fasteners, glue or other adhesive, frictional fit and/or combinations thereof) and generally cooperate to define an inner space for containing various components as more fully described herein.

In the preferred embodiment depicted in FIG. 1 and FIG. 2, said lower housing member 10 and upper housing member 30 are substantially cylindrical and have sections having different diameter dimensions; however, it is to be observed that the basic shape and configuration of said lower housing member 10 and upper housing member 30 can be changed to other shapes and/or configurations without departing from the scope of the present invention. Lower housing member 10 and upper housing member 30 can be manufactured in any number of different manners, including using injection molding and three-dimensional (3-D) printing technology.

In the embodiment depicted in FIG. 1 and FIG. 2, lower housing member 10 is attached to upper housing member 30 using threaded screws (not depicted in FIG. 1) that can be received within countersunk holes 13. Countersunk screw holes 14 can also be provided at or near the base of said lower housing member 10 to secure other items within said lower housing member 14 (as more fully described below) using conventional threaded fasteners. Still referring to FIG. 1, in a preferred embodiment, a plurality of transverse vent ports 12 are disposed in spaced relationship around the circumference of said lower housing member 10.

Still referring to FIG. 1 and FIG. 2, upper housing member 30 defines throat extension section or member 31 defining a central outlet port 32. In a preferred embodiment, throat extension section 31 has a substantially cylindrical shape and is generally sized to fit within the bottom opening of a conventional golf glove. A plurality of plurality of transverse vent ports 33 are disposed in spaced relationship around the circumference of said throat extension section 31. In a preferred embodiment, said transverse vent ports 33 are elongated and oriented substantially parallel to the central longitudinal axis of said throat extension section 31.

A flexible yet resilient loop 20 is disposed on said throat extension section 31 and extends across central outlet port 32 of said extension section 31. In a preferred embodiment, the ends of said flexible yet resilient loop 20 are mounted about 180-degrees from each other (that is, directly across said central outlet port 32). Optional flexible yet resilient secondary loops 21 and 22 are also pivotally attached to said throat extension section 31 and can pivot or rotate about pivot pins 23. An optional mounting loop 34 defining eyelet 34*a* can also be provided on upper housing member 30 for attachment of a carabiner or other attachment means.

Flexible yet resilient loop 20, secondary loops 21 and 22, and throat extension section 31 (including internal and external surfaces) are easily accessible without specialized tools or techniques. As such, said components—as well as other components of dryer apparatus 10 that typically come in contact with a golf glove—can be easily cleaned and disinfected when desired such as, for example, between uses of dryer apparatus 10. Although other means can be utilized without departing from the scope of the present invention, said components can be easily, conveniently and fully wiped down with a disinfectant towelette or treated with a disinfectant spray or mist in order to thoroughly clean and disinfect said surfaces.

Figure 3:
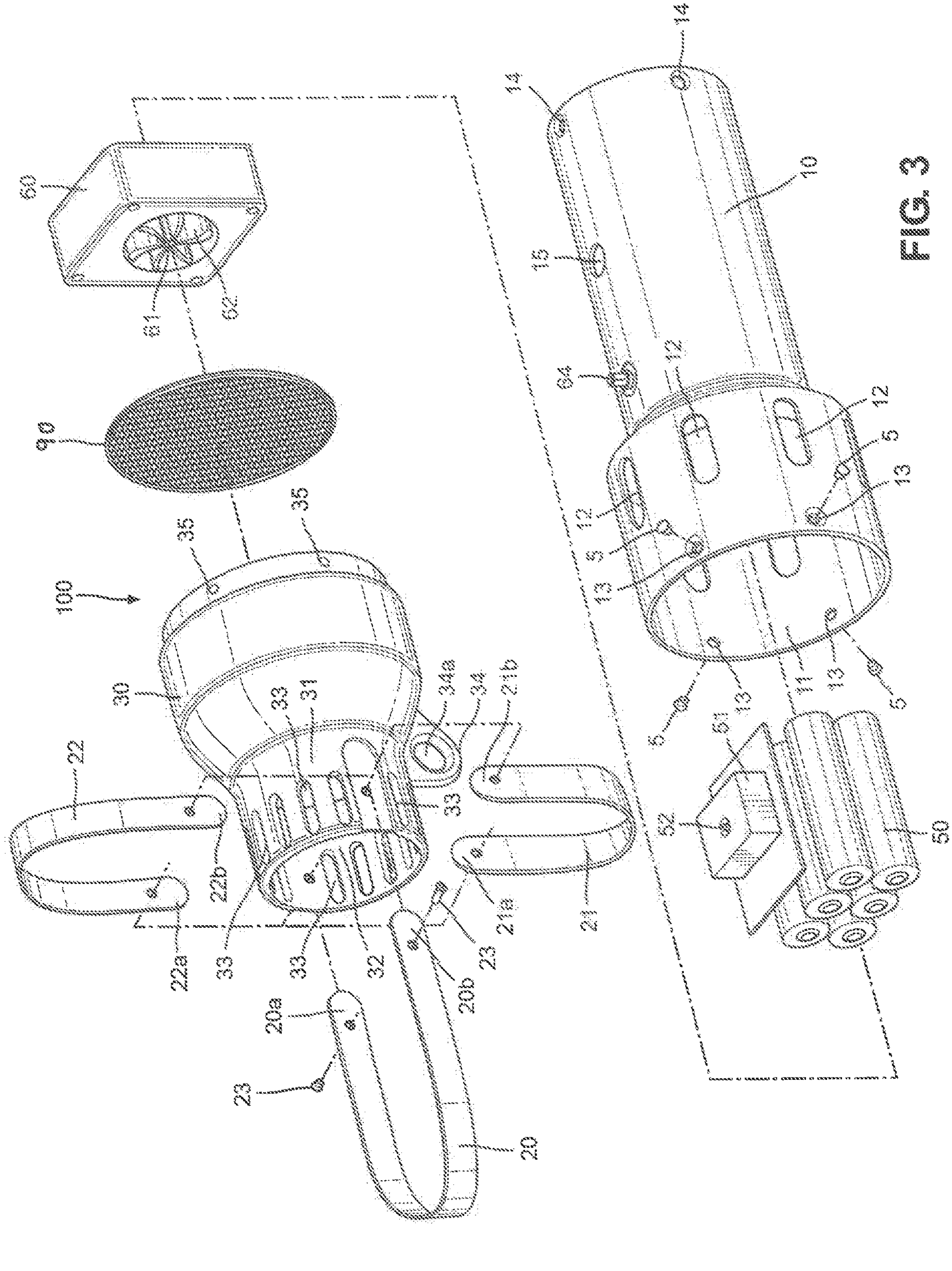
FIG. 3 depicts a side sectional view of a dryer apparatus of the present invention.

FIG. 3 depicts a side perspective and exploded view of a dryer apparatus 100 of the present invention. Dryer apparatus 100 generally comprises lower housing member 10 and upper housing member 30. In the embodiment depicted in FIG. 3, said lower housing member 10 and upper housing member 30 are joined together via conventional screws received within countersunk bores 13. A plurality of transverse countersunk bores 14 also extend through said lower housing member 10. As depicted in FIG. 3, lower housing member 10 defines an inner space 11 for containing various components within said inner space 11 of lower housing member 10. In the embodiment depicted in FIG. 3, said lower housing member 10 is substantially cylindrical and has sections having different diameter dimensions. A plurality of transverse vent ports 12 are disposed in spaced relationship around the circumference of said lower housing member 10; although other shapes and patterns can be employed, in a preferred embodiment said transverse ports are elongated and disposed in spaced relationship around the circumference of said lower housing member 10.

Battery 50 is disposed within inner space 11 of lower housing 10 and secured in place against unwanted or inadvertent movement within said inner space 11. Said battery 50 can comprise a single battery device, or multiple individual batteries arranged and connected to provide desired power output. In a preferred embodiment, said battery 50 can further comprise a mounting support 51 and recharging connection interface 52. Said battery 50 can be recharged, using electricity generated from solar energy or other power source. Further, said battery can be recharged via recharging connection interface 52 using a cable (such as, for example, a micro-USB cable) that can be attached to a charging port (such as, for example, on a powered golf cart or battery pack charger). In a preferred embodiment, said recharging connection interface 52 can be accessed from outside lower housing 10 via recharging access port 15 that extends through said lower housing 10 and is aligned with said recharging connection interface 52.

Fan 60 is also disposed within inner space 11 of lower housing 10. In a preferred embodiment, said fan 60 generally comprises a high static pressure electric fan having shaft 61, fan blades 62 and at least one electric motor (not visible in FIG. 3). Said electric fan 60 is powered by attached rechargeable battery 50. Although not depicted in FIG. 3, conventional electrical wires or other electrical connectors can be provided to connect said electric fan 60 to battery 50, as well as any other electrically connected components described herein. Said fan 60 is supported within the inner space 11 of said lower housing 10 and directs air flow in desired direction(s) as described in detail herein. Variable speed control 64, which can be easily accessed from outside lower housing 10, permits a user to control the speed of rotation of fan blades 62 which, in turn, controls the volume and velocity of air flow generated by said fan 60.

Lower housing member 10 is attached to upper housing member 30 using threaded screws 5; said threaded screws 5 are received within countersunk holes 13 of lower housing member 10 and aligned holes 35 in upper housing member 30. Upper housing member 30 further has throat extension section 31 defining central outlet port 32. In a preferred embodiment, throat extension section 31 has a substantially cylindrical shape and is generally sized to fit within the lower or bottom opening of a conventional golf glove. A plurality of elongated transverse vent ports 33 are disposed in spaced relationship around the circumference of said throat extension section 31.

Flexible yet resilient loop 20 is disposed on said throat extension section 31 and extends across central outlet port 32 of said extension section 31. Ends 20*a* and 20*b* of said flexible yet resilient loop 20 are mounted approximately 180-degrees from each other (that is, directly across said central outlet port 32). It is to be observed that said flexible yet resilient loop 20 generally forms a convex shape across the central outlet port 32 of throat section 31

Optional flexible yet resilient secondary loops 21 and 22 are also pivotally attached to said throat extension section 31. Ends 21*a* and 21*b* of secondary loop 21 are pivotally attached to throat extension section 31, while ends 22*a* and 22*b* of secondary loop 22 are pivotally attached to throat extension section 31. Said optional yet resilient secondary loops 21 and 22 can pivot or rotate about pivot pins 23. Optional mounting loop 34 forming eyelet 34*a* can also be provided on upper housing member 30 for connection to a carabiner or other means that can be used to removably attach dryer apparatus 100 to a golf bag or other object.

Protective mesh screen 90 is received within upper housing member 30, and is generally disposed between fan 60 and central outlet port 32 of throat extension section 31. In a preferred embodiment, said protective mesh screen 90 includes openings that are sufficiently large to permit air to flow through said openings without causing significant resistance or backpressure. However, said openings in protective mesh screen 90 should prevent body parts (including, without limitation, fingers and thumbs, or portions thereof) from being inserted within said central outlet port 32 and contacting fan blades 62 of electric fan 60. Put another way, said protective mesh screen 90 forms a protective barrier to keep fingers, thumbs and other body parts from coming in contact with fan blades 62 of electric fan 60.

Figure 4:
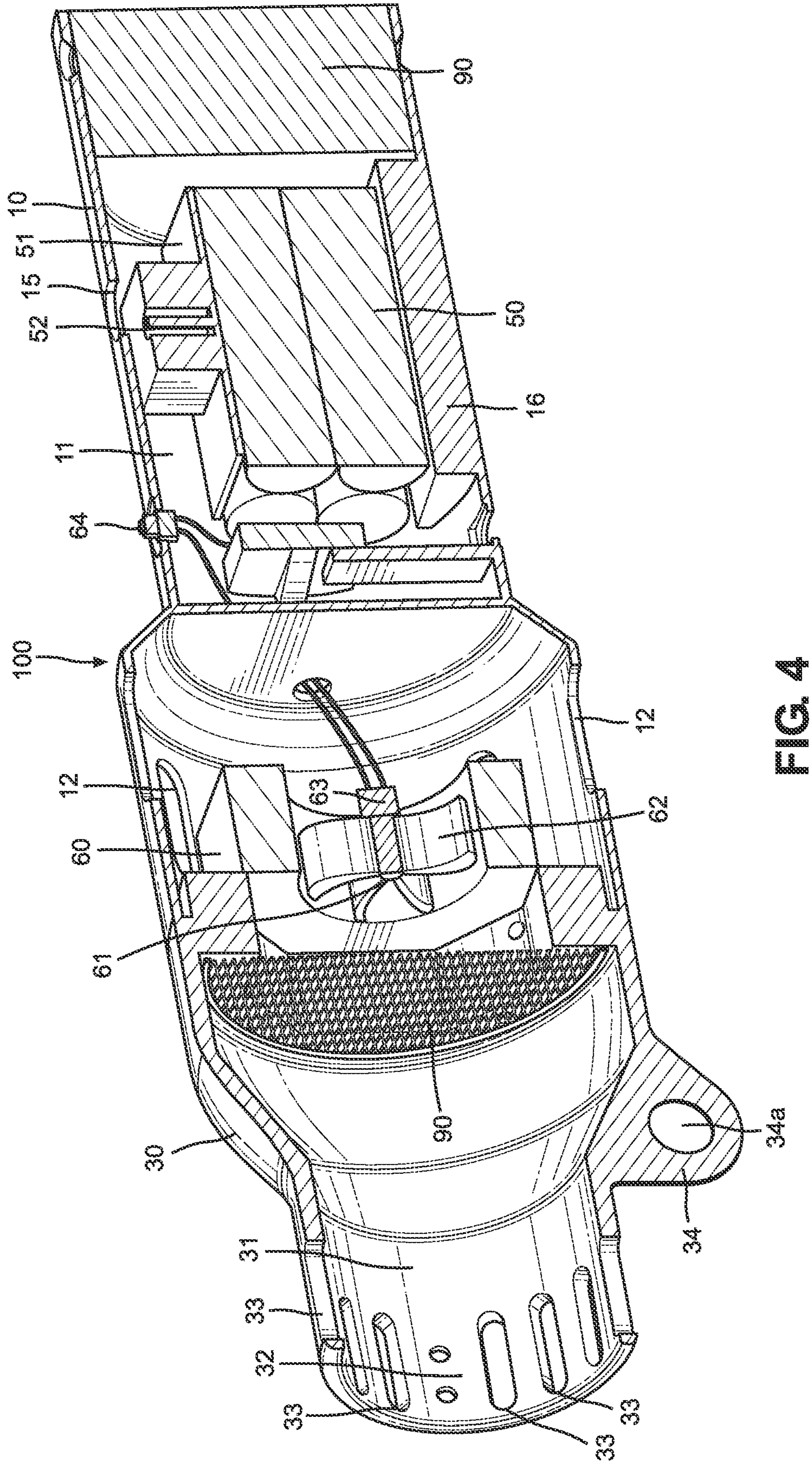
FIG. 4 depicts a side perspective and exploded view of a dryer apparatus of the present invention.

FIG. 4 depicts a side sectional view of a dryer apparatus 100 of the present invention. In the preferred embodiment, said dryer apparatus 100 generally comprises lower housing member 10 and upper housing member 30 that are joined together to form a body member or unitary housing defining an inner space (including, without limitation, inner space 11 of lower housing member 10). In the embodiment depicted in FIG. 4, at least a portion of lower housing member 10 forms a substantially cylindrical section having a desired outer diameter dimension. A plurality of elongated transverse vent ports 12 are disposed in spaced relationship around the circumference of said lower housing member 10.

Battery 50 is disposed within inner space 11 of lower housing 10 and secured in place against unwanted or inadvertent movement. As depicted in FIG. 4, said battery 50 is received upon inner support shoulder 16 to provide stability and protect battery 50 against unwanted movement. As previously noted, said battery 50 can comprise a single battery device, or multiple separate batteries arranged and connected to provide desired power output. Battery 50 further comprises mounting support 51 and recharging connection interface 52 which can be accessed from outside lower housing member 10 through charging access port 15 that extends through said lower housing member 10. Optional base support 90 can be received within said inner space 11 of lower housing member 10 and secured in place to provide additional weight to the base of dryer apparatus 100.

Fan 60 is disposed within inner space 11 of lower housing 10. In a preferred embodiment, said fan 60 generally comprises a high static pressure electric fan having shaft 61, fan blades 62 and at least one electric motor 63. Rechargeable battery 50 provides power to operate said electric fan 60. Fan 60 creates directed air flow in desired direction(s). Variable speed control 64 permits a user to control the rotational speed of fan blades 62, which controls the volume and velocity of air flow generated by said fan 60. Fan 60 generates air flow through central outlet port 32 in throat member 31, as well through transverse elongated ports or vents 33 extending through said throat member 31.

Upper housing member 30 defines throat extension section 31 forming central outlet port 32. Throat extension section 31 has a substantially cylindrical shape and is generally sized to fit within the lower or bottom opening of a conventional golf glove. A plurality of elongated transverse vent ports 33 are disposed in spaced relationship around the circumference of said throat extension section 31. Optional mounting loop 34 forming eyelet **34*a* can also be provided on upper housing member 30 for connection to a carabiner or other means that can be used to removably attach dryer apparatus 100** to a golf bag or other object.

Protective mesh screen 90 is received within upper housing member 30 and is disposed between fan 60 and central outlet port 32 of throat extension section 31. Protective mesh screen 90 includes openings that are sufficiently large to permit air to flow through said openings in said mesh screen 90 without causing significant resistance to air flow. Protective mesh screen 90 prevents body parts (including, without limitation, fingers and thumbs, or portions thereof) from being inserted within said central outlet port 32 of throat extension section 31 and contacting fan blades 62 of electric fan 60 which could cause injury.

Figure 5:
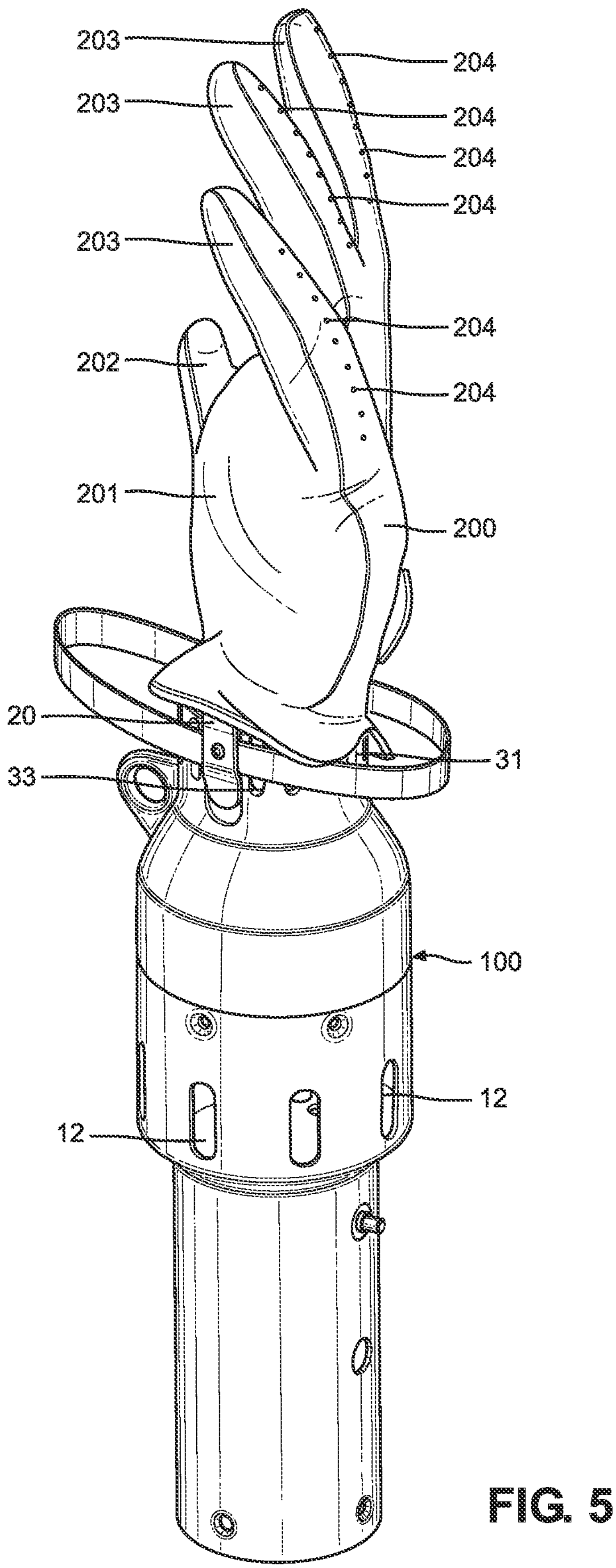
FIG. 5 depicts a side perspective view of a dryer apparatus of the present invention in operation drying a golf glove.

FIG. 5 depicts a side perspective view of dryer apparatus 100 of the present invention in operation drying a golf glove 200. As illustrated in FIG. 5, throat extension section 31 of dryer apparatus 100 can be inserted within the base opening of golf glove 200. In this configuration, it is to be observed that flexible yet resilient loop 20 is partially received within palm section 201 of golf glove 200. Said flexible yet resilient loop 20 acts to spread or expand said glove 200 generally outward, keeping said glove 200 open and preventing said glove 200 from collapsing or folding inward. It is to be observed that many golf gloves include a U-shaped or V-shaped slit along the lower opening of the glove; a flap utilizing a hook and loop fastener can be used to selectively adjust the size of the lower opening of said glove. Said flap can be opened in order to quickly and conveniently slip said glove over throat extension 31 and loop 20, and then fastened to secure said glove in place When fan 60 (not visible in FIG. 5) of dryer apparatus 100 is in operation, air is drawn into said dryer apparatus 100 through vent ports 12. Fan 60 causes said air to flow generally into glove 200 through throat extension section 31 (and, more particularly, through central outlet port 32, visible in FIG. 1) as well as elongated side vent ports 33. In this manner, said air current generally flows into golf glove 200; said air flow can beneficially enter through the base opening of said expanded golf glove 200, pass through palm section 201 of said golf glove 200, into thumb 202 and fingers 203, and out through ventilation holes 204.

Flexible yet resilient loop member 200 keeps said glove 200 supported and expanded to permit air movement into palm section 201, thumb 202, fingers 203 and through ventilation holes 204, thus improving drying efficiency and reducing drying time. In this manner, said air flow is allowed to flow through said glove 200, entering through the base opening of said glove 200 and exiting through ventilation holes 204. Additionally, a portion of said air flow also passes through vent ports 33 adjacent to or in the vicinity of palm section 201 of glove 200, which promotes faster drying of said palm section 201.

Air flow or air current generated by fan 60 that flows through the inside of golf glove 200 increases evaporation of moisture (including, without limitation, sweat or rain) present on or absorbed within said golf glove 200. In this manner, dryer apparatus 100 increases the evaporation rate of moisture or water content in said glove 200, thereby causing said glove 200 to dry faster and more efficiently than without use of said dryer apparatus 100.

Figure 6:
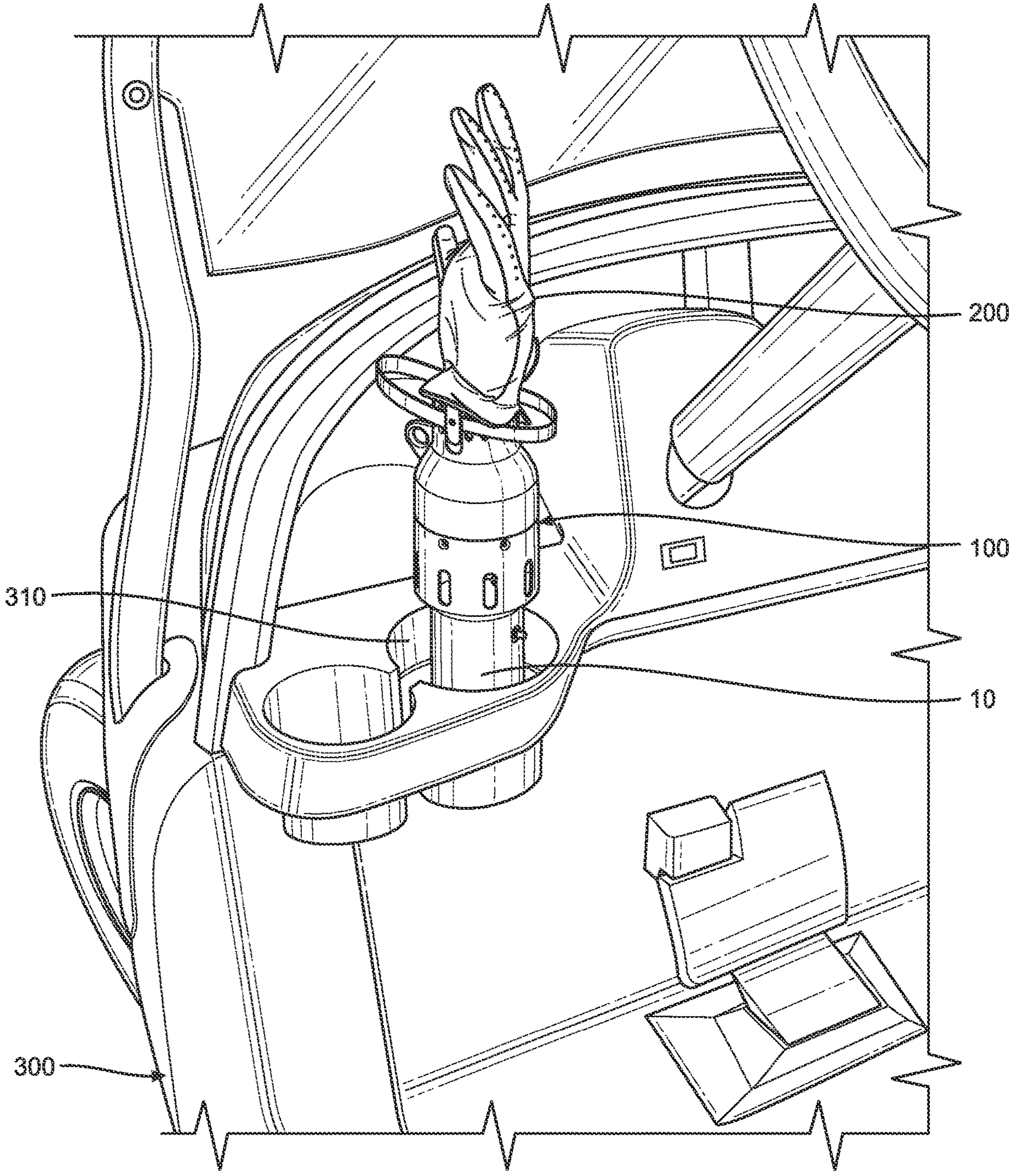
FIG. 6 depicts a side perspective view of a dryer apparatus of the present invention installed in the cup holder of a conventional golf cart.

FIG. 6 depicts a side perspective view of a dryer apparatus 100 of the present invention temporarily installed within a cup holder 310 of a conventional golf cart 300. The base of lower housing 10 is beneficially configured to be received within said cup holder 310, while maintaining stability of dryer apparatus 100 including, without limitation, while cart 300 is moving. Alternatively, said dryer apparatus 100 can attach to said cart 300 using other mounting means (such as, for example, via a ball and socket joint or other mounting mechanism). It is to be observed that dryer apparatus 100 can be used to dry a golf glove 200 when cart 300 is stationary or moving; movement of said cart 300 is not required in order for dryer apparatus 100 to operate and dry golf glove 200.

Figure 7:
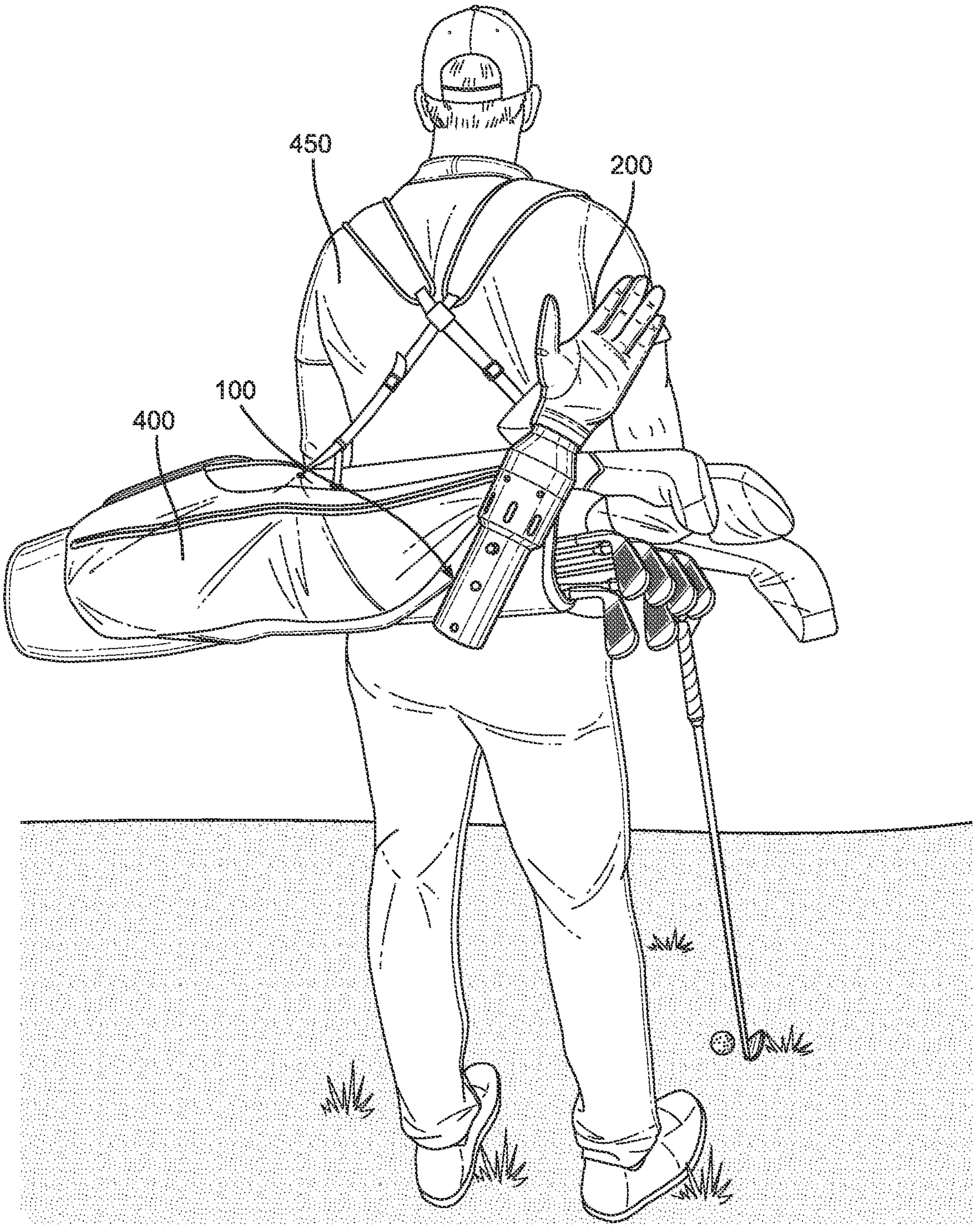
FIG. 7 depicts a perspective view of a dryer apparatus of the present invention mounted on a conventional golf bag supported by golfer.

FIG. 7 depicts a perspective view of dryer apparatus 100 of the present invention mounted on a conventional "carried" golf bag 400 supported by golfer 450. Dryer apparatus 100 is beneficially configured to remain stable and generally in an upright position including, without limitation, while golfer 450 is moving (such as, for example, between golf shots).

Figure 8:
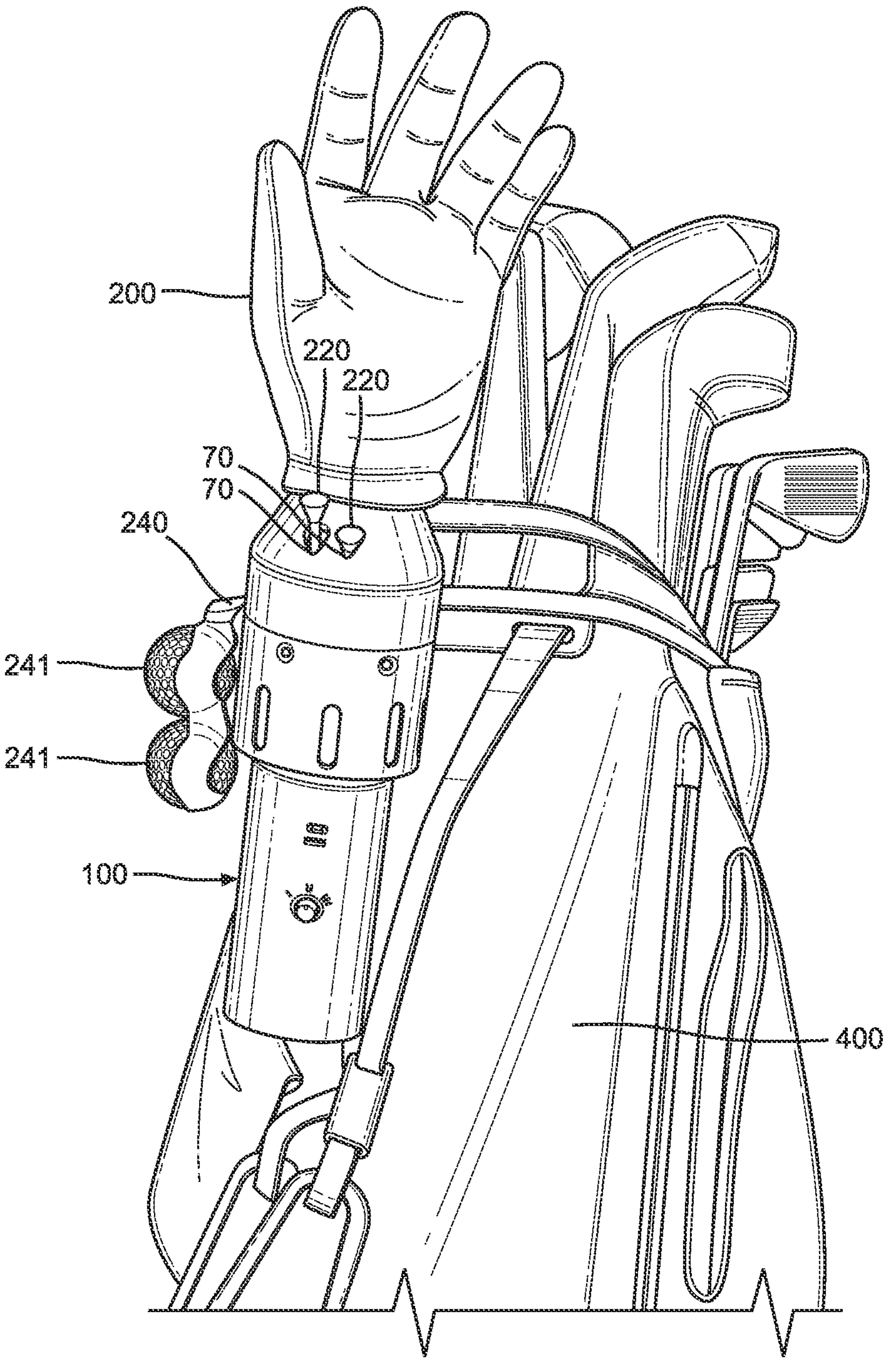
FIG. 8 depicts a perspective view of dryer apparatus of the present invention including certain accessories and related modifications.
Figure 9:
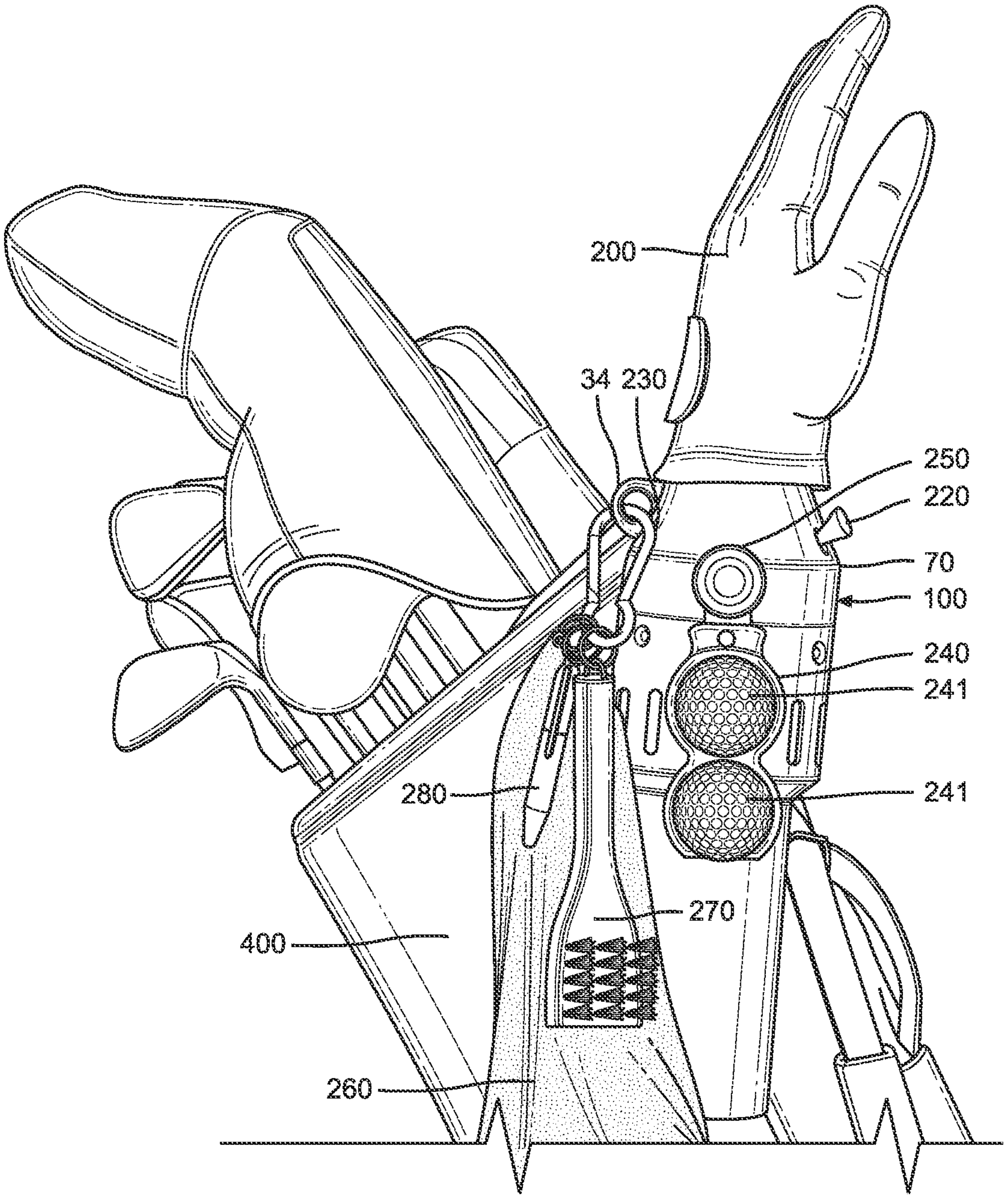
FIG. 9 depicts a perspective view of dryer apparatus of the present invention including certain accessories and related modifications rotated approximately 90 degrees from the view depicted in FIG. 8.

FIG. 8 depicts a perspective view of dryer apparatus 100 of the present invention, including certain accessories and related modifications, mounted on a conventional "carried" golf bag 400. FIG. 9 depicts a perspective view of said dryer apparatus 100 including certain accessories and related modifications rotated approximately 90 degrees from the view depicted in FIG. 8. As depicted in FIGS. 8 and 9, dryer apparatus 100 includes at least one aperture 70, each sized and conveniently positioned to receive and hold a golf tee 220. Carabiner 230 can be attached to mounting loop 34 and can be used to easily and conveniently attach any number of desired tools and/or accessories to dryer apparatus 100 including, without limitation, towel 260, brush (such as a shoe brush) 270 and marker 280. Additionally, ball holder 240 for retaining spare golf balls 241, as well as ball mark repair tool 250, can also be easily and conveniently attached to said dryer apparatus 100.

It is to be observed that, prior to departing home or other location, some or all of said accessories can be installed on said dryer apparatus 100. Thus, when a golfer departs for a golf course or golf practice facility, all of said accessories can be easily and conveniently transported via said dryer apparatus 100. Put another way, each of said accessories need not be separately gathered and transported and, thus, potentially inadvertently forgotten or left behind.

It is to be observed that dryer apparatus 100 can further comprise optional area lighting (such as LED light(s)), an electronic or conventional compass, a speaker including wireless or "Bluetooth" connection capability, a wind speed and/or direction gauge, a barometer and/or a thermometer. Said dryer apparatus 100 can be manufactured with desired colors (such as color combinations of college or professional sports teams) while also providing a mounting surface for promotional messages and/or displays.

In operation, a golfer can hit a golf shot wearing a golf glove, such as glove 200. Thereafter, said golfer can remove said golf glove 200 and place same on drying apparatus 100 of the present invention. During periods of non-use (such as between golf swings, when a golfer is riding in a cart or walking to a next shot location), the fan of the present invention can cause air to flow through said glove 200, thereby causing retained moisture in the glove 200 to dry (evaporate); said evaporation occurs much quicker than said glove 200 would dry without said dryer apparatus 100. Said golfer can then remove said dried glove 200 from dryer apparatus 100, put it on his/her hand, and again use said glove 200 for a subsequent golf swing.

In a preferred embodiment, fan 60 operates with a low decibel noise level to avoid disturbing or distracting golfers in the vicinity of dryer apparatus 100. Further, variable speed control 64 permits speed of said fan 60 to be selectively controlled. Thus, said fan can be permitted to operate at higher speeds (which creates higher noise level and greater drying effect) when no golfer is in the vicinity of dryer apparatus 100 or when ambient noise drowns out the noise from said fan 60 (such as while moving on a golf cart). Alternatively, said fan speed can be selectively decreased when desired, such as, for example, when dryer apparatus 100 is being used on a cart that pulls within earshot of another golfer taking a swing.

Referring back to FIG. 3, it is to be observed that optional flexible yet resilient secondary loops 21 and 22 can pivot or rotate about pivot pins 23 and can be selectively positioned to be received within flexible yet resilient loop 20. Thus, when flexible yet resilient secondary loops 21 and 22 are aligned and received within flexible yet resilient loop 20, said loops all collectively cooperate to form a convenient handle grip for carrying dryer apparatus 100. However, one or both of said flexible yet resilient secondary loops 21 and 22 can be selectively moved out of alignment with loop 20, thereby forming a support structure for receiving a hat, towel or other object (other than a golf glove) to be dried using dryer apparatus 100.

In a preferred embodiment, dryer apparatus 100 does not include a heating element. In many cases, said dryer apparatus 100 is used in relatively hot environments; such environments promote profuse sweating that can lead to saturation of golf gloves. As such, in many cases, application of additional heat to a golf glove in an already hot environment is not desirable and does not materially promote efficient drying of said glove. Further, such a heating element would significantly increase power demand, thereby reducing the amount of time that dryer apparatus 100 can operate between charging.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for drying moisture from a golf glove having a palm section and ventilated fingers, said apparatus comprising:

a) a housing defining an internal chamber and a throat section, wherein said throat section has a substantially cylindrical shape defining a central outlet, and a plurality of elongated transverse outlet vents extending through said throat section;

b) a fan disposed in said internal chamber, wherein said fan is oriented to direct air flow through said central outlet and said plurality of elongated transverse outlet vents extending through said throat section;

c) a power source for powering said fan; and d) a first flexible yet rigid loop that extends across said central outlet of said throat member and is configured to be received within the palm section of a golf glove, wherein a portion of said palm section of said golf glove is positioned adjacent to at least one of said elongated transverse outlet vents extending through said throat section, and wherein a portion of said air flow from said fan is directed at said palm section of said golf glove; and further comprising a second flexible yet rigid loop, wherein said second flexible yet rigid loop is pivotally attached to said throat member and is configured to be selectively positioned in alignment with said first flexible yet rigid loop, or out of alignment with said second flexible yet rigid loop.

2. The apparatus of claim 1, further comprising a control for selectively adjusting the speed of said fan.

3. The apparatus of claim 1, wherein said power source comprises at least one rechargeable battery.

4. The apparatus of claim 1, wherein said housing further comprises a substantially cylindrical base for being received in a cup holder of a conventional golf cart.

5. The apparatus of claim 1, further comprising at least one aperture in said housing for receiving a golf tee, a compass, a speaker, a wind gauge, a golf ball holder, a brush, a marker, a divot repair tool, or a combination thereof.

6. A method for drying moisture from a golf glove having a lower opening, a palm section and ventilated fingers, said method comprising:

a) providing a dryer apparatus comprising:

i) a housing defining an internal chamber and a throat section, wherein said throat section has a substantially cylindrical shape defining a central outlet, and a plurality of elongated transverse outlet vents extending through said throat section;

ii) a fan disposed in said internal chamber, wherein said fan is oriented to direct air flow through said central outlet and said plurality of elongated transverse outlet vents extending through of said throat section;

iii) a power source for powering said fan; and iv) a first flexible yet rigid loop that extends across said central outlet of said throat member;

b) installing said lower opening around said throat section, wherein said flexible yet rigid loop is received within said palm section of a golf glove and a portion of said palm section of said golf glove is positioned adjacent to at least one of said elongated transverse outlet vents extending through said throat section; and c) operating said fan to direct a first portion of air flow through said plurality of elongated transverse outlet vents at said palm section of said golf glove, and a second portion of said air flow into said golf glove and out of ventilations in said ventilated fingers of said golf glove; and wherein said dryer apparatus further comprises at least one additional flexible yet rigid loop pivotally attached to said throat member.

7. The method of claim 6, wherein said dryer apparatus further comprises a control for selectively adjusting the speed of said fan.

8. The method of claim 6, wherein said power source comprises at least one rechargeable battery.

9. The method of claim 6, wherein said housing further comprises a substantially cylindrical base for being received in a cup holder of a conventional golf cart.

10. The method of claim 9, wherein said dryer apparatus is received within said cup holder of the conventional golf cart.

11. The method of claim 6, wherein said dryer apparatus is secured to a golf bag.

12. The method of claim 6, wherein said housing further comprises at least one aperture in said housing for receiving a golf tee, a compass, a speaker, a wind gauge, a golf ball holder, a brush, a marker, a divot repair tool, or a combination thereof.

13. The method of Claim 6, wherein said flexible yet rigid loops are positioned out of alignment with each other.

* * * * *